No. 787,660. PATENTED APR. 18, 1905.
M. CAHILL.
SHOVEL OR SPADE.
APPLICATION FILED AUG. 4, 1904.
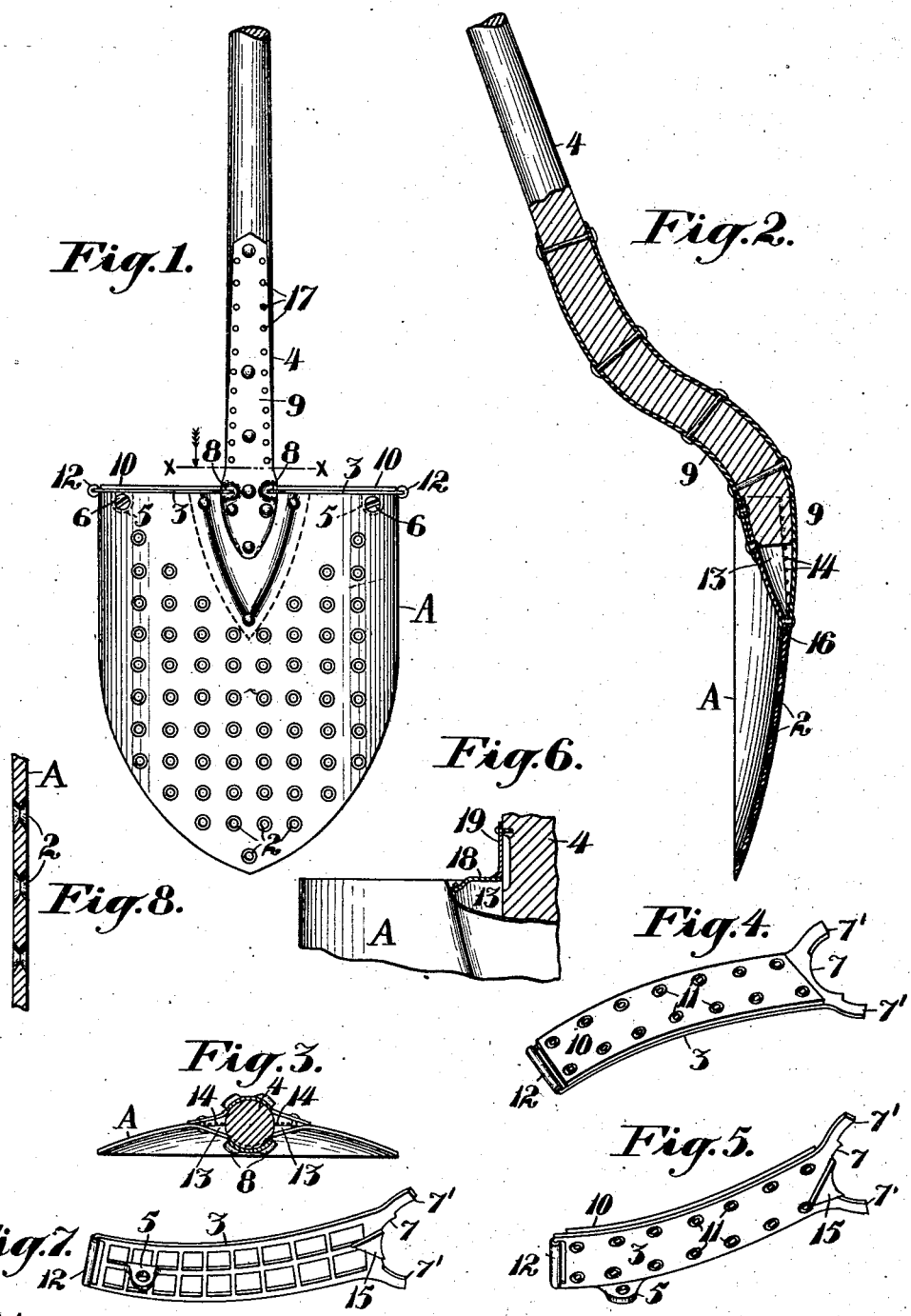
Witnesses:-
F. C. Fiedner
J. H. Kruse
Inventor,
Michael Cahill
By Geo. H. Strong. Atty.

No. 787,660.  
Patented April 18, 1905.

UNITED STATES PATENT OFFICE.

MICHAEL CAHILL, OF SAN FRANCISCO, CALIFORNIA.

SHOVEL OR SPADE.

SPECIFICATION forming part of Letters Patent No. 787,660, dated April 18, 1905.

Application filed August 4, 1904. Serial No. 219,571.

*To all whom it may concern:*

Be it known that I, MICHAEL CAHILL, a citizen of the United States, residing in the city and county of San Francisco and State of California, have invented new and useful Improvements in Shovels or Spades, of which the following is a specification.

My invention relates to improvements in shovels and spades. Its object is to provide a serviceable practical implement of this character especially suitable for operating in heavy mud, such as "adobe," or in plastic soils where it is often difficult to detach the tool and load from the sod and to unload the tool.

The invention compasses the peculiar perforating of the blade of the shovel or spade to prevent the dirt sticking to the blade and providing a removable attachment for the top of the blade which will afford a broad resilient support for the foot in pressing the implement into the ground and which will protect the foot from injury in case it slips off the blade.

Having reference to the accompanying drawings, Figure 1 is a front view of my improved shovel. Fig. 2 is a central section of same. Fig. 3 is a section on line $x\ x$ of Fig. 1. Fig. 4 is a perspective of a presser-plate viewed from the top. Fig. 5 is a perspective of a presser-plate viewed from the under side. Fig. 6 is an elevation in partial section of a fragment of the blade, showing a closure for the oil-cavities. Fig. 7 shows a modified form of presser-plate. Fig. 8 is an enlarged view showing method of perforating blade.

A represents the blade of a shovel having the perforations 2. These perforations are distinguished particularly in that they are double cone-shaped or reamed out so that they have their greatest diameter in the plane of the face of the blade, the walls of the perforations converging toward the back of the blade and being countersunk at both ends, whereby a sharp inside cutting edge is provided and the unloading of the tool is aided. The minimum diameter of the perforations would be approximately three-sixteenths of an inch, and the perforations would be so disposed over the blade as not to weaken it and at the same time to allow sufficient ingress of air from the back to overcome the atmospheric pressure on the load clinging to the front of the blade. The double cone shape of the perforations has been found to be advantageous in that the dirt and mud are more easily expelled from the holes than where the walls of the latter are straight.

In order to assist in pressing the implement into the ground by giving a substantial support for the foot and to protect and save the boot or shoe, I have shown a presser-plate 3, adapted to be removably secured to the upper edge of the blade on either side of the handle 4. The presser-plate may be attached to the blade in a variety of ways. Preferably it has a downward projection 5, attached to the blade and having a threaded perforation to receive a screw 6, passed from the front through a hole in the blade. The edges of the part are preferably beveled, so that no substantial obstruction is afforded at the rear to the downward movement of the blade into the soil. By having the central portion of the part enlarged and threaded it serves all the purposes of a nut for the screw 6. This presser-plate is provided at the handle end with lateral prongs or tangs extending in the plane of the plate. The central portion 7 is adapted to be pressed against the wood of the handle, and the two lateral prongs or tangs 7' are adapted to engage the guides or notches 8 on or formed in the front and rear plates 9, by which the blade is secured to the handle. The purpose of the guides or notches 8 is to give a substantial support for the broadened inner end of the plate to enable it to better resist the strain to which it is more or less subjected, while at the same time by reason of the bearing aforded to the opposite edges of the plate by the tangs and notches and the connection 5 6 the blade is braced against cracking or breakage around the base of the handle-socket immediately below the juncture of the plates 9 with the blade.

The plate 3 is preferably covered with a sheet of rubber, leather, canvas, or other suitable soft material, as indicated at 10, which will afford a comfortable surface for the foot to press against and will prevent the abrading of the shoe. The covering 10 may be secured to the plate by any suitable means. As shown, the plate is perforated, and the eyelets 11 are inserted and crimped so as to engage beneath the plate and on top of the covering. To protect the foot or boot from injury in case the foot slips off the implement, the plate may be provided with a transversely-disposed rubber roller 12 at its outer end.

Under some circumstances digging is facilitated by moistening the back of the blade slightly with oil. Accordingly the spaces 13 in the handle-socket on either side of the handle may be utilized as oil-cups, having each a series of small outlets 14 between the base of the rear plate 9 and the blade, the plates 3 serving as closures for the cups and being each provided with a triangular boss 15, on its under side conformable with the shape of an oil-chamber. The edges of the back plate are preferably made square and not sharply beveled, as commonly constructed, since this sharp edge usually conduces to the breaking of the blade by reason of the fulcrum afforded by the plate. The back of the blade is formed with a slight ledge 16, against which the convergent edges of the back plate abut and transmit pressure to the blade.

The edges of the front and rear plates 9 along their portions embracing the handle may be perforated, as at 17, to allow quick repair in the event of fracture.

In case it is not desired to use the presser-plates a closure at 18 may be fitted into each oil-cavity 13 flush with the top edge of the spade or shovel and held in position by means of the spring 19.

Having thus described my invention, what I claim, and desire to secure by Letters Patent, is—

1. An implement of the character described having a perforated blade and with the walls of the perforations converging from opposite sides of the blades toward the center thereof to form interior cutting edges.

2. A spade or shovel having a perforated blade, the perforations in the blade each having walls diverging from the central portion of the blade toward opposite sides thereof whereby the junction of said walls forms an interior cutting edge.

3. A spade or shovel having cavities formed in the handle-socket on either side of the handle, said cavities provided with outlets adjacent to the blade, and closures for the cavities.

4. A spade or shovel provided with liquid-containing chambers, said chambers having outlets onto the back of the blade.

5. The combination with a spade or shovel of a removable presser-plate having means of attachment with the blade, said plate having one end bearing against the handle, and guides on the handle with which the plate loosely engages to prevent twist.

6. The combination with a spade or shovel of a removable presser-plate having means of attachment with the blade, said plate having one end bearing against the handle, and guides on the handle with which the plate loosely engages to prevent twist, and a roller supported at the outer end of said plate.

7. A presser-plate for spades and shovels, having means of attachment with the blade thereof, and a resilient covering for said plate.

8. A presser-plate for spades and shovels, having means of attachment with the blade thereof and a resilient perforated covering for said plate.

9. A presser-plate for spades and shovels having means of attachment with the blade thereof, and a roller carried by said plate.

10. A presser-plate for spades and shovels having means of attachment with the blade thereof and a roller disposed at the end of and transverse to the plate.

In testimony whereof I have hereunto set my hand in presence of two subscribing witnesses.

MICHAEL CAHILL.

Witnesses:
S. H. NOURSE,
JESSIE C. BRODIE.